US011175408B2

(12) United States Patent
Kwon et al.

(10) Patent No.: US 11,175,408 B2
(45) Date of Patent: Nov. 16, 2021

(54) APPARATUS AND METHOD FOR PRECISE POSITION CORRECTION USING POSITIONING DIFFERENCE

(71) Applicant: KOREA EXPRESSWAY CORP., Gimcheon-si (KR)

(72) Inventors: Oh Cheol Kwon, Uiwang-si (KR); In Gu Choi, Seongnam-si (KR); Shi Han Kim, Seoul (KR); Jae Hyung Park, Suwon-si (KR); Sung Hwan Kim, Seoul (KR); Gi Chang Kim, Anyang-si (KR); Duk Jung Kim, Yongin-si (KR)

(*) Notice: Subject to any disclaimer, the term of this patent is extended or adjusted under 35 U.S.C. 154(b) by 147 days.

(21) Appl. No.: 16/683,294

(22) Filed: Nov. 14, 2019

(65) Prior Publication Data

US 2021/0072400 A1    Mar. 11, 2021

(30) Foreign Application Priority Data

Sep. 11, 2019    (KR) .......................... 10-2019-0112769

(51) Int. Cl.
  *G01S 19/07*        (2010.01)
  *G01S 19/40*        (2010.01)
          (Continued)

(52) U.S. Cl.
  CPC .............. *G01S 19/07* (2013.01); *G01S 19/40* (2013.01); *G01S 19/235* (2013.01); *G01S 19/25* (2013.01); *G01S 19/31* (2013.01)

(58) Field of Classification Search
  CPC ........ G01S 19/07; G01S 19/235; G01S 19/40; G01S 19/075; G01S 19/25; G01S 19/31
          (Continued)

(56) References Cited

U.S. PATENT DOCUMENTS 6,229,478 B1* 5/2001 Biacs ................... G01S 19/256
                                                  342/357.42
6,429,808 B1* 8/2002 King ...................... G01S 19/20
                                                  342/357.44
(Continued)

FOREIGN PATENT DOCUMENTS

DE    102011051100 A1    12/2012
JP      H11-183588 A      7/1999
(Continued)

OTHER PUBLICATIONS

English Specification of 2018-227727.
(Continued)

*Primary Examiner* — Chuong P Nguyen
(74) *Attorney, Agent, or Firm* — Antonio & Ha U.S. Patent, LLC (57) ABSTRACT

According to an embodiment, an apparatus for precise position correction using a positioning difference comprises a first distribution information obtaining unit gathering first distribution information from an external terminal, a global navigation satellite system (GNSS) receiver obtaining a GNSS positioning value of the apparatus based on a GNSS, and a positioning correcting unit obtain a corrected location of the apparatus by correcting the GNSS positioning value using the gathered first distribution information. The first distribution information includes a GNSS positioning value of the external terminal, a GNSS positioning time, a precise positioning value, and a positioning difference between the GNSS positioning value and the precise positioning value.

10 Claims, 6 Drawing Sheets

(51) Int. Cl.
*G01S 19/23* (2010.01)
*G01S 19/31* (2010.01)
*G01S 19/25* (2010.01)

(58) Field of Classification Search
USPC ............ 342/357.44, 357.23, 357.62, 357.64, 342/357.71
See application file for complete search history.

(56) References Cited

U.S. PATENT DOCUMENTS

| | | | | |
|---|---|---|---|---|
| 7,064,706 | B2* | 6/2006 | King | G01S 19/071 |
| | | | | 342/357.44 |
| 7,498,984 | B2* | 3/2009 | Taniguchi | G01S 5/021 |
| | | | | 342/357.4 |
| 7,623,871 | B2* | 11/2009 | Sheynblat | G01S 1/026 |
| | | | | 342/357.31 |
| 7,688,261 | B2* | 3/2010 | DiEsposti | G01S 19/24 |
| | | | | 342/357.64 |
| 7,917,156 | B2* | 3/2011 | Sheynblat | H04W 64/00 |
| | | | | 455/456.1 |
| 9,405,010 | B2* | 8/2016 | Appleford | G01S 19/41 |
| 10,101,464 | B2* | 10/2018 | Appleford | G01S 19/04 |
| 2004/0189515 | A1* | 9/2004 | Vannucci | G01S 19/05 |
| | | | | 342/357.29 |
| 2013/0093618 | A1 | 4/2013 | Oh | |
| 2015/0362596 | A1* | 12/2015 | Nozaki | G01S 19/07 |
| | | | | 342/357.44 |
| 2017/0215046 | A1 | 7/2017 | Moebus et al. | |
| 2018/0364366 | A1 | 12/2018 | Cvijetic et al. | |
| 2020/0057162 | A1* | 2/2020 | Kashiwagi | H04B 7/18521 |
| 2021/0072405 | A1* | 3/2021 | Kwon | G01S 19/45 |

FOREIGN PATENT DOCUMENTS

| | | |
|---|---|---|
| JP | 2000-180525 A | 6/2000 |
| JP | 2001-124841 A | 5/2001 |
| JP | 2002-214324 A | 7/2002 |
| JP | 2006-112822 A | 4/2006 |
| JP | 2006-226772 A | 8/2006 |
| JP | 2007-201921 A | 8/2007 |
| JP | JP2007-201921 A | 8/2007 |
| JP | 2009-257763 A | 11/2009 |
| JP | 2010-112869 A | 5/2010 |
| KR | 10-1131049 | 3/2012 |
| KR | 10-2017-0049489 | 5/2017 |
| WO | 2014-020949 | 2/2014 |
| WO | 2018-227727 | 12/2018 |
| WO | 2019-131299 | 7/2019 |

OTHER PUBLICATIONS

English Specification of 2014-020949.
English Specification of 2019-131299.
English Specification of JPH11-183588A.
English Specification of JP2001-124841A.
English Specification of JP2010-112869A.
English Specification of JP2006-112822A.
English Specification of JP2006-226772A.
English Specification of JP2000-180525A.
English Specification of JP2007-201921A.
English Specification of JP2009-257763A.
English Specification of JP2002-214324A.
English Specification of 10-2017-0049489.
English Specification of 10-1131049.
English Specification of DE102011051100A1.

* cited by examiner

Fig. 6

APPARATUS AND METHOD FOR PRECISE POSITION CORRECTION USING POSITIONING DIFFERENCE

CROSS-REFERENCE TO RELATED APPLICATION(S)

This application is based on and claims priority under 35 U.S.C. 119 to Korean Patent Application No. 10-2019-0112769, filed on Sep. 11, 2019, in the Korean Intellectual Property Office, the disclosure of which is herein incorporated by reference in its entirety.

TECHNICAL FIELD

Embodiments of the disclosure relate to an apparatus and method for precise position correction using a positioning difference, and more specifically, to a precise position correcting apparatus and method using a positioning difference, which may obtain the precise location of the precise position correcting apparatus based on distribution information including a positioning difference between precise positioning information and GNSS positioning information broadcast from, e.g., moving mobile means or stationary base stations.

DESCRIPTION OF RELATED ART

A global navigation satellite system (GNSS) is a system designed to locate aircraft, vessels, or vehicles using satellites, and example GNSSs include the United States' global positioning system (GPS), Russia's global navigation satellite system (GLONASS), the European Union's Galileo, and China's BeiDou.

GNSSs may provide navigation to GNSS receiver-equipped vehicles based on location information for the vehicles.

Various types of error may degrade precision of GNSS positioning, which may include ionospheric and tropospheric errors, satellite clock errors, ephemeris data errors, receiver quality, multipath error, and dilution of precision (DOP), and the accuracy degradation may worsen in underground parking garages, tunnels, or downtown where satellite signal reception weakens.

As such, GNSS-based positioning information shows errors due to various factors, with the result of poor location-based services (LBSs).

There are some systems or apparatus which may reduce errors. However, such conventional systems or apparatus are costly and hence impracticable. Therefore, a need arises for technology capable of minimizing GNSS errors.

SUMMARY

An object of the disclosure is to provide a precise position correcting apparatus and method using a positioning difference, wherein a moving mobile means or stationary base station broadcasts distribution information including a positioning difference between GNSS positioning information and precise positioning information, and the precise position correcting apparatus calculates its precise location based on the received distribution information.

According to an embodiment, an apparatus for precise position correction using a positioning difference comprises a first distribution information obtaining unit gathering first distribution information from an external terminal, a global navigation satellite system (GNSS) receiver obtaining a GNSS positioning value of the apparatus based on a GNSS, and a positioning correcting unit obtain a corrected location of the apparatus by correcting the GNSS positioning value using the gathered first distribution information. The first distribution information includes a GNSS positioning value of the external terminal, a GNSS positioning time, a precise positioning value, and a positioning difference between the GNSS positioning value and the precise positioning value.

The apparatus may further comprise a second distribution information generating unit generating second distribution information broadcast to an outside of the apparatus. The second distribution information may include the GNSS positioning value of the apparatus and the positioning time, the corrected location of the apparatus, and a positioning difference between the corrected location of the apparatus and the GNSS positioning value of the apparatus.

The first distribution information may further include information about at least one of the number of satellites used for GNSS positioning of the external terminal, transmission power of the first distribution information, and positioning quality of the first distribution information. The apparatus may further comprise a priority determining unit selecting one with a highest priority from among pieces of the first distribution information gathered using at least one of the number of the satellites used for GNSS positioning of the external terminal, a difference between the transmission power and reception power of the first distribution information, the GNSS positioning time included in the first distribution information, a time of reception of the first distribution information, and the positioning quality of the first distribution information. The positioning correcting unit may calculate the corrected location of the apparatus using the selected piece of first distribution information.

The apparatus may further comprise a second distribution information generating unit generating second distribution information including the GNSS positioning value of the apparatus and the positioning time, the corrected location of the apparatus, and the positioning difference between the corrected location of the apparatus and the GNSS positioning value of the apparatus. The second distribution information may further include at least one of the number of satellites used for GNSS positioning of the apparatus, transmission power of the second distribution information, and positioning quality of the second distribution information. The second distribution information may be broadcast to an outside of the apparatus to be used for the external terminal to correct the GNSS positioning value of the external terminal.

When two pieces of the first distribution information are received, the positioning correcting unit calculates a distance to the external terminal transmitting the first distribution information and calculates the corrected location of the apparatus using interpolation depending on the calculated distance.

When the GNSS receiver fails to obtain the GNSS positioning value of the apparatus, the first distribution information obtaining unit gathers at least three or more pieces of the first distribution information, the priority determining unit selects one with a higher priority from among the gathered pieces of the first distribution information, and the positioning correcting unit calculates a distance to the external terminal transmitting the first distribution information and calculates the corrected location of the apparatus using the calculated distance and trigonometry surveying.

According to an embodiment, a method for precise position correction using a positioning difference is performed by an apparatus for precise position correction using the positioning difference, and the method comprises gathering first distribution information from an external terminal, the first distribution information including a GNSS positioning value of the external terminal, a positioning time, a precise positioning value, and a positioning difference between the GNSS positioning value and the precise positioning value, obtaining a GNSS positioning value of the apparatus based on a GNSS, and obtaining a corrected location of the apparatus by correcting the GNSS positioning value of the apparatus using the gathered first distribution information.

The method may further comprise generating second distribution information broadcast to an outside of the apparatus. The second distribution information may include the GNSS positioning value of the apparatus and the positioning time, the corrected location of the apparatus, and a positioning difference between the corrected location of the apparatus and the GNSS positioning value of the apparatus.

The first distribution information may further include information about at least one of the number of satellites used for GNSS positioning of the external terminal, transmission power of the first distribution information, and positioning quality of the first distribution information. The method may further comprise, before obtaining the corrected location, selecting one with a highest priority from among pieces of the first distribution information gathered using at least one of the number of the satellites used for GNSS positioning of the external terminal, a difference between the transmission power and reception power of the first distribution information, the GNSS positioning time included in the first distribution information, a time of reception of the first distribution information, and the positioning quality of the first distribution information. Obtaining the corrected location may include obtaining the corrected location of the apparatus using the selected piece of first distribution information.

The method may further comprise generating second distribution information including the GNSS positioning value of the apparatus and the positioning time, the corrected location of the apparatus, and the positioning difference between the corrected location of the apparatus and the GNSS positioning value of the apparatus. The second distribution information may further include at least one of the number of satellites used for GNSS positioning of the apparatus, transmission power of the second distribution information, and positioning quality of the second distribution information. The second distribution information may be broadcast to an outside of the apparatus to be used for the external terminal to correct the GNSS positioning value of the external terminal.

When two pieces of the first distribution information are received, obtaining the corrected location includes calculating a distance to the external terminal transmitting the first distribution information and obtaining the corrected location of the apparatus using interpolation depending on the calculated distance.

When a GNSS receiver of the apparatus fails to obtain the GNSS positioning value of the apparatus, gathering the first distribution information includes gathering at least three or more pieces of the first distribution information, selecting the first distribution information with the higher priority includes selecting one with a higher priority from among the gathered pieces of the first distribution information, and obtaining the corrected location includes calculating a distance to the external terminal transmitting the first distribution information and obtaining the corrected location of the apparatus using the calculated distance and trigonometry surveying.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

The terms as used herein are provided merely to describe some embodiments thereof, but not to limit the disclosure. The terms as used herein are provided merely to describe some embodiments thereof, but not to limit the scope of other embodiments of the disclosure. Unless otherwise defined, all terms including technical and scientific terms used herein have the same meaning as commonly understood by one of ordinary skill in the art to which the embodiments of the disclosure pertain and should not be interpreted as overly broad or narrow. As used herein, terms wrong or inappropriate for representing the spirit of the disclosure may be replaced with and understood as more proper ones to represent the spirit of the disclosure by one of ordinary skill in the art. General terms as used herein should be interpreted in the context of the specification or as defined in dictionaries.

As used herein, the singular forms "a," "an," and "the" are intended to include the plural forms as well, unless the context clearly indicates otherwise. As used herein, the term "comprise," "include," or "have" should be appreciated not to preclude the presence or addability of features, numbers, steps, operations, components, parts, or combinations thereof as set forth herein.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the disclosure.

Hereinafter, exemplary embodiments of the inventive concept will be described in detail with reference to the accompanying drawings. The same reference denotations may be used to refer to the same or substantially the same elements throughout the specification and the drawings.

When determined to make the subject matter of the disclosure unclear, the detailed description of the known art or functions may be skipped. The accompanying drawings are provided for an easier understanding of the spirit of the reception but the disclosure should not be limited thereby.

Figure 1:
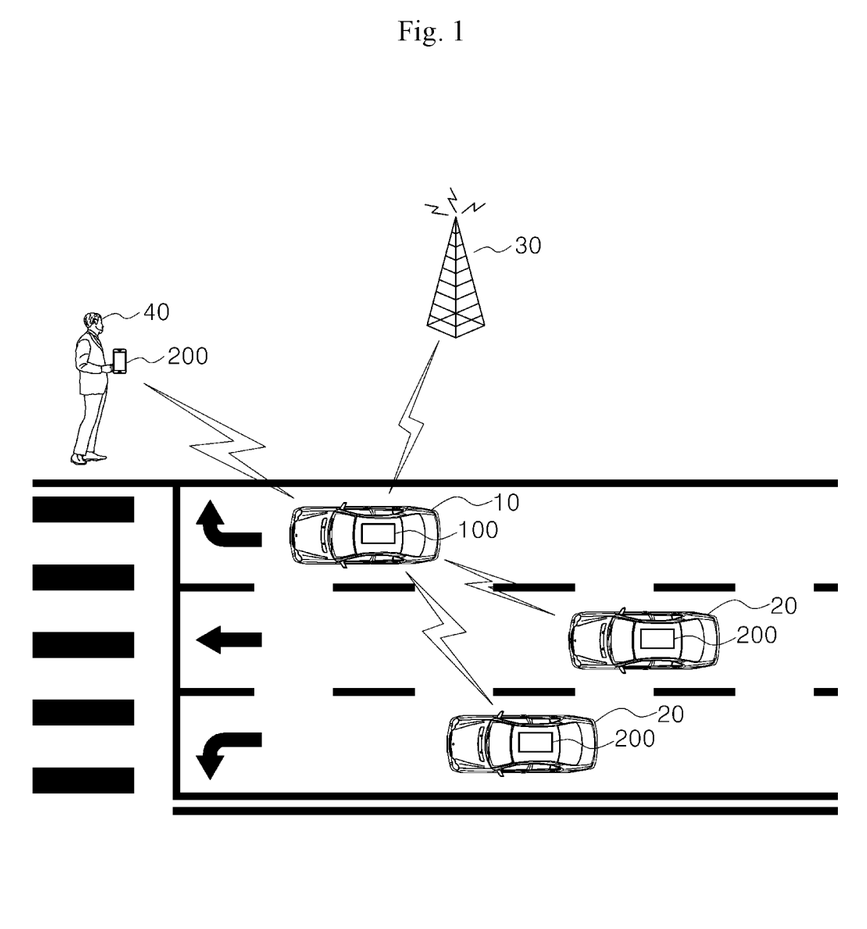
FIG. 1 is a view illustrating an example apparatus and method for precise position correction using a positioning difference according to an embodiment.

FIG. 1 is a view illustrating an example apparatus and method for precise position correction using a positioning difference according to an embodiment.

According to an embodiment of the disclosure, an apparatus and method for precise position correction using a positioning difference may obtain its own precise position based on distribution information including a positioning difference between precise positioning information and GNSS positioning information broadcast from each of moving mobile means (e.g., precise position correcting apparatuses equipped in vehicles or user mobile terminals) or stationary relays or base stations. The apparatus for precise position correction using a positioning difference may be simply referred to herein as a precise position correcting apparatus.

According to an embodiment, the precise position correcting apparatus 100, after calculating its own precise position, may calculate a positioning difference between its own GNSS positioning location and the calculated precise position, generate distribution information including the positioning difference, and broadcast the distribution information to the outside of the precise position correcting apparatus 100.

Referring to FIG. 1, the precise position correcting apparatus 100 may receive and obtain distribution information including a positioning difference between GNSS positioning value and precise positioning value from precise position correcting apparatuses 200 equipped in vehicles 20 driving around the precise position correcting apparatus 100, a mobile terminal 200, e.g., a smartphone, of a pedestrian 40 around the precise position correcting apparatus 100, and a wireless communication base station or relay 30.

The precise position correcting apparatus 100 may enhance the accuracy of its current location by correcting its GNSS positioning value obtained based on a GNSS using the positioning difference included in the gathered distribution information.

After precisely correcting its current location using the distribution information, the precise position correcting apparatus 100 may calculate a positioning difference between the precise corrected location, which has newly been calculated, and its prior-obtained GNSS positioning value, generate distribution information including the calculated positioning difference, and broadcast the generated distribution information to the outside.

Each terminal may receive the distribution information, correct its GNSS positioning value based on GNSS and using the received distribution information to thereby obtain its precise corrected location, calculate a positioning difference between its calculated corrected location and its GNSS positioning value, and distribute the positioning difference back to the outside.

As distribution information broadcast around increases, the accuracy of positioning value correction may increase. According to an embodiment, the precise position correcting apparatus 100 may receive distribution information, precisely correct its current location, and distribute distribution information including the GNSS positioning value and the precise corrected location back to the outside. Receiving the distribution information, the terminals may correct their own GNSS-based positioning value using the positioning difference included in the received distribution information, thereby minimizing GNSS errors.

As described below, to enhance the accuracy of positioning value correction, the distribution information may include the GNSS positioning time, GNSS positioning value, precise positioning value (or corrected location value), and the positioning difference between the GNSS positioning value and the precise positioning value, and the distribution information may further include at least one piece of information of the number of GNSS satellites used for GNSS positioning, transmission power of the distribution information, and positioning quality of the distribution information.

According to an embodiment, the precise position correcting apparatus 100 may be applicable to various terminals or devices, such as smartphones, portable terminals, mobile terminals, foldable terminals, personal digital assistants (PDAs), portable multimedia players (PMPs), telematics terminals, navigation terminals, personal computers, laptop computers, slate PCs, tablet PCs, ultrabook computers, wearable devices, such as smartwatches, smart glasses, head-mounted displays, etc., Wibro terminals, Internet protocol television (IPTV) terminals, smart TVs, digital broadcast terminals, audio video navigation (AVN) terminals, audio/video (A/V) systems, flexible terminals, or digital signage devices.

Figure 2:
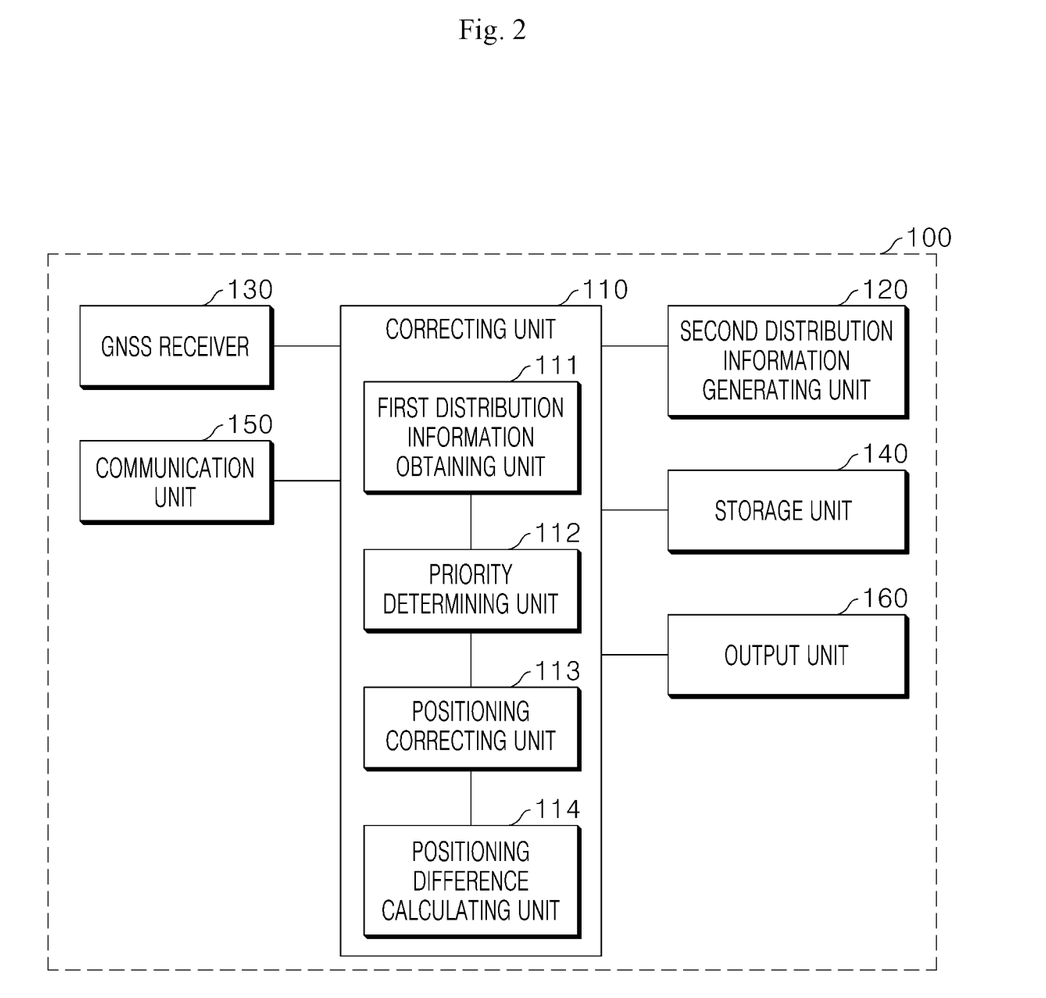
FIG. 2 is a block diagram illustrating a precise position correcting apparatus using a positioning difference according to an embodiment.

FIG. 2 is a block diagram illustrating a precise position correcting apparatus using a positioning difference according to an embodiment.

Referring to FIG. 2, according to an embodiment, a precise position correcting apparatus 100 may include a correcting unit 110 and a GNSS receiver 130 and may further include at least one of a second distribution information generating unit 120, a communication unit 150, a storage unit 140, and an output unit 160.

The GNSS receiver 130 may obtain the GNSS positioning time and GNSS positioning value of the precise position correcting apparatus 100 based on a global navigation satellite system (GNSS).

The communication unit 150 may receive first distribution information broadcast from an external terminal and may broadcast second distribution information generated by the precise position correcting apparatus 100 to the outside of the precise position correcting apparatus 100.

The communication unit 150 may be configured to use various communication standards including 802.11 which is a set of wireless network standards or protocols including some infrared (IR) communications and wireless local area network (LAN) proposed by the Institute of Electrical and Electronics Engineers (IEEE), 802.15 which is a set of standards or protocols for wireless personal area network (PAN) including Bluetooth, ultra-wideband (UWB), and ZigBee, 802.16 which is a set of standards or protocols including broadband wireless access (BWA), metropolitan area network (MAN), and fixed wireless access (FWA), or 802.20 which is a set of mobile Internet standards or protocols for mobile broadband wireless access (MBWA) including WiMAX, wireless access in vehicular environments (WAVE), and Wibro.

The first distribution information, as information received from the terminal, may include the GNSS positioning time of the external terminal, GNSS positioning value, precise positioning value, and the positioning difference between the GNSS positioning value and the precise positioning value. As described below, the first distribution information may further include information about at least one of the number of GNSS satellites (or GNSS satellite receptions)

used for GNSS positioning of the external terminal, transmission power of the first distribution information, and the positioning quality of the first distribution information.

The second distribution information, as information broadcast by the precise position correcting apparatus 100 to the outside of the precise position correcting apparatus 100, may include the GNSS positioning value and positioning time of the precise position correcting apparatus 100, corrected location, and the positioning difference between the GNSS positioning value and the corrected location. As described below, the second distribution information may further include information about at least one of the number of GNSS satellites (or GNSS satellite receptions) used for GNSS positioning of the precise position correcting apparatus 100, transmission power of the second distribution information, and positioning quality of the second distribution information.

The first distribution information and the second distribution information may have the same data format and may be information generated by precise position correcting apparatuses of the disclosure. The first distribution information may mean distribution information generated by an external precise position correcting apparatus other than the precise position correcting apparatus 100, and the second distribution information may mean distribution information generated and distributed by the precise position correcting apparatus 100.

The correcting unit 110 includes a first distribution information obtaining unit 111 and a positioning correcting unit 113 and may include a priority determining unit 112 and a positioning difference calculating unit 114.

The first distribution information obtaining unit 111 gathers the first distribution information received from the communication unit 150. The first distribution information may be distribution information received from the external terminal and may include the GNSS positioning value and positioning time of the external terminal, precise positioning value, and the positioning difference between the GNSS positioning value and the precise positioning value. The first distribution information may further include information about at least one of the number of satellites (or satellite receptions) used for GNSS positioning of the external terminal, transmission power of the first distribution information, and positioning quality of the first distribution information.

The positioning correcting unit 113 may correct the GNSS positioning value of the precise position correcting apparatus 100 using the gathered first distribution information, thereby calculating the current corrected location of the precise position correcting apparatus 100. The corrected location may be location value information resultant from correcting the GNSS positioning value of the precise position correcting apparatus 100 using the first distribution information, and the corrected location may be accuracy-enhanced location information.

The priority determining unit 112 may select the optimal one for the precise position correcting apparatus 100 among the pieces of first distribution information gathered. The priority determining unit 112 may select the optimal piece of first distribution information considering at least one of the number of GNSS satellite receptions of the external terminal included in the first distribution information, the difference between the transmission power and reception power of the first distribution information, the GNSS positioning time included in the first distribution information, the time of reception of the first distribution information, and positioning quality of the first distribution information.

The priority determining unit 112 selects the optimal piece of first distribution information from multiple pieces of first distribution information using at least one or more of pieces of information about the number of satellite receptions used for GNSS positioning of the external terminal, the difference between the transmission power and reception power of the first distribution information, GNSS positioning time included in the first distribution information, the time of reception of the first distribution information, and the positioning quality of the first distribution information.

As the number of GNSS satellite receptions increases, GNSS positioning value errors may reduce, the distance to the external terminal having transmitted the first distribution information may be calculated based on the transmission power of the first distribution information when the first distribution information is transmitted and the reception power of the first distribution information when the first distribution information is received. The freshness of the GNSS positioning value and the received first distribution information may be known based on the time of reception of the first distribution information and the GNSS positioning time included in the first distribution information. Therefore, such information may be used to determine the order of priority of multiple pieces of first distribution information.

The positioning quality included in the first distribution information is information quantified with weights determined according to experimental values as to how many pieces of first distribution information the external terminal having sent the first distribution information has calculated the precise positioning value based on, the mean positioning quality of the selected piece of first distribution information, whether the external terminal having sent the first distribution information has obtained the GNSS positioning value when calculating the precise positioning value, whether the first distribution information is first distribution information generated, and how many external terminals the first distribution information has passed through to be broadcast.

It may be more advantageous to select a piece of first distribution information which is closer to the external terminal, has more GNSS satellite receptions and thus less GNSS positioning errors, is generated latest, and has a higher positioning quality, among the multiple pieces of first distribution information received from multiple external terminals.

The priority determining unit 112 may select the optimal piece of first distribution information among the multiple pieces of first distribution information received from the multiple external terminals considering at least one or more pieces of information among the number of GNSS satellite receptions of the external terminal, the difference between the transmission power and reception power of the first distribution information, the GNSS positioning time included in the first distribution information, the time of reception of the first distribution information, and the positioning quality of the first distribution information. The respective weights for the number of GNSS satellite receptions of the external terminal, the difference between the transmission power and reception power of the first distribution information, the GNSS positioning time included in the first distribution information, the time of reception of the first distribution information, and the positioning quality of the first distribution information may be experimentally determined. The priority determining unit 112 may select the optimal piece of first distribution information considering the pieces of information and their respective weights.

After multiple pieces of first distribution information are gathered via the communication unit 150 from multiple external terminals, and the optimal piece of first distribution information to the precise position correcting apparatus 100 is selected by the priority determining unit 112, the positioning correcting unit 113 may correct the GNSS positioning value of the precise position correcting apparatus 100 using the selected piece of first distribution information, thereby calculating the final precise, corrected location of the precise position correcting apparatus 100 and hence enhancing location accuracy.

The positioning difference calculating unit 114 may calculate the positioning difference between the precise corrected location of the precise position correcting apparatus 100, which is calculated by the positioning correcting unit 113, and the GNSS positioning value of the precise position correcting apparatus 100, which is obtained by the GNSS receiver 130.

The second distribution information generating unit 120 generates second distribution information including the GNSS positioning value and positioning time of the precise position correcting apparatus 100, the corrected location obtained using the first distribution information, and the positioning difference between the calculated corrected location and the GNSS positioning value of the precise position correcting apparatus 100 and broadcasts the generated second distribution information via the communication unit 150 to the outside of the precise position correcting apparatus 100. The second distribution information may further include information about the number of GNSS satellites (or GNSS satellite receptions) used for GNSS positioning of the precise position correcting apparatus 100, transmission power of the second distribution information, and positioning quality of the second distribution information.

The GNSS receiver 130 periodically obtains the GNSS positioning location of the precise position correcting apparatus 100. The correcting unit 110 corrects the GNSS positioning location of the precise position correcting apparatus 100 using the first distribution information gathered at the time synchronized with the GNSS positioning time, thereby calculating the precise corrected location of the precise position correcting apparatus 100. The second distribution information generating unit 120 generates the second distribution information, and the communication unit 150 broadcasts the generated second distribution information to the outside of the precise position correcting apparatus 100.

The storage unit 140 may store the first distribution information gathered in real-time via the communication unit 150 and store the second distribution information periodically generated by the second distribution information generating unit 120.

The output unit 160 may output various pieces of information on the screen or in voice. The GNSS positioning value according to the GNSS receiver 130, the precise positioning value (or corrected location value) calculated by the correcting unit 110, the current location according to the precise positioning value (or corrected location value) in a high-definition map image, and various images or content necessary for the user may be displayed on the screen or output in voice by the output unit 160. The output unit 160 may be implemented as a display capable of outputting images or video and/or as a speaker outputting various sounds or voices.

Figure 3:
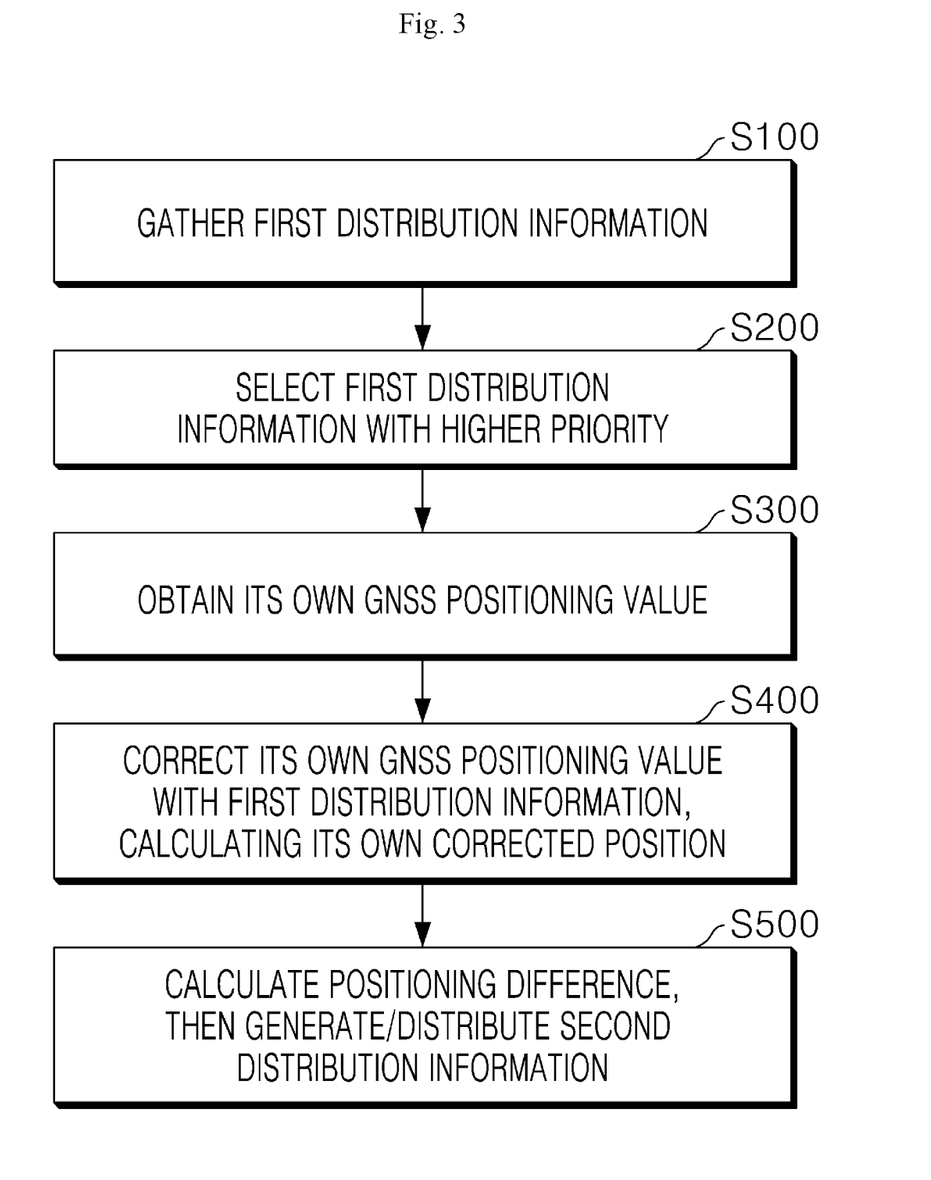
FIG. 3 is a flowchart illustrating a method for precise position correction using a positioning difference according to an embodiment.

FIG. 3 is a flowchart illustrating a method for precise position correction using a positioning difference according to an embodiment.

According to an embodiment, a method for precise position correction using a positioning difference may be performed by the above-described precise position correcting apparatus (e.g., the precise position correcting apparatus 100).

According to an embodiment, the precise position correcting apparatus 100 gathers first distribution information including the GNSS positioning time and GNSS positioning value of an external terminal, a precise positioning value, and a difference between the GNSS positioning value and the precise positioning value from the external terminal (S100).

The first distribution information may further include information about at least one of the number of satellites (or GNSS satellite receptions) used for GNSS positioning of the external terminal, transmission power of the first distribution information, and the positioning quality of the first distribution information.

As described above, after step S100, the priority determining unit 112 of the precise position correcting apparatus 100 selects the optimal piece of first distribution information, which has a higher priority, from multiple pieces of first distribution information using at least one or more of pieces of information about the number of satellite receptions used for GNSS positioning of the external terminal, the difference between the transmission power and reception power of the first distribution information, GNSS positioning time included in the first distribution information, the time of reception of the first distribution information, and the positioning quality of the first distribution information (S200).

The precise position correcting apparatus 100 obtains its own GNSS positioning value based on a GNSS (S300). Although FIG. 3 illustrates that step S300 is performed after step S100, steps S100 and S300 may be performed simultaneously and independently.

Then, the precise position correcting apparatus 100 may correct its GNSS positioning value using the gathered first distribution information, thereby calculating its corrected location (S400). If there are a number of pieces of first distribution information gathered, the precise position correcting apparatus 100 may calculate its corrected location using a piece of first distribution information selected via step S200.

Then, the precise position correcting apparatus 100 calculates a positioning difference which is a difference between its GNSS positioning value and its corrected location, generates second distribution information including the calculated positioning difference value, and broadcasts the second distribution information to the outside (S500).

The second distribution information may include the GNSS positioning value and positioning time of the precise position correcting apparatus 100, the corrected location of the precise position correcting apparatus 100, and the positioning difference between the corrected location of the precise position correcting apparatus 100 and the GNSS positioning value of the precise position correcting apparatus 100. The second distribution information may further include at least one piece of information among the number of satellite receptions used for GNSS positioning of the precise position correcting apparatus 100, transmission power of the second distribution information, and positioning quality of the second distribution information.

The pieces of information included in the second distribution information may have substantially the same property as the pieces of information included in the first distribution information, and no repeated description thereof is given.

The second distribution information may be broadcast to the outside of the precise position correcting apparatus 100, and the broadcast second distribution information may be used for the external terminal to obtain its precise positioning value.

Figure 4:
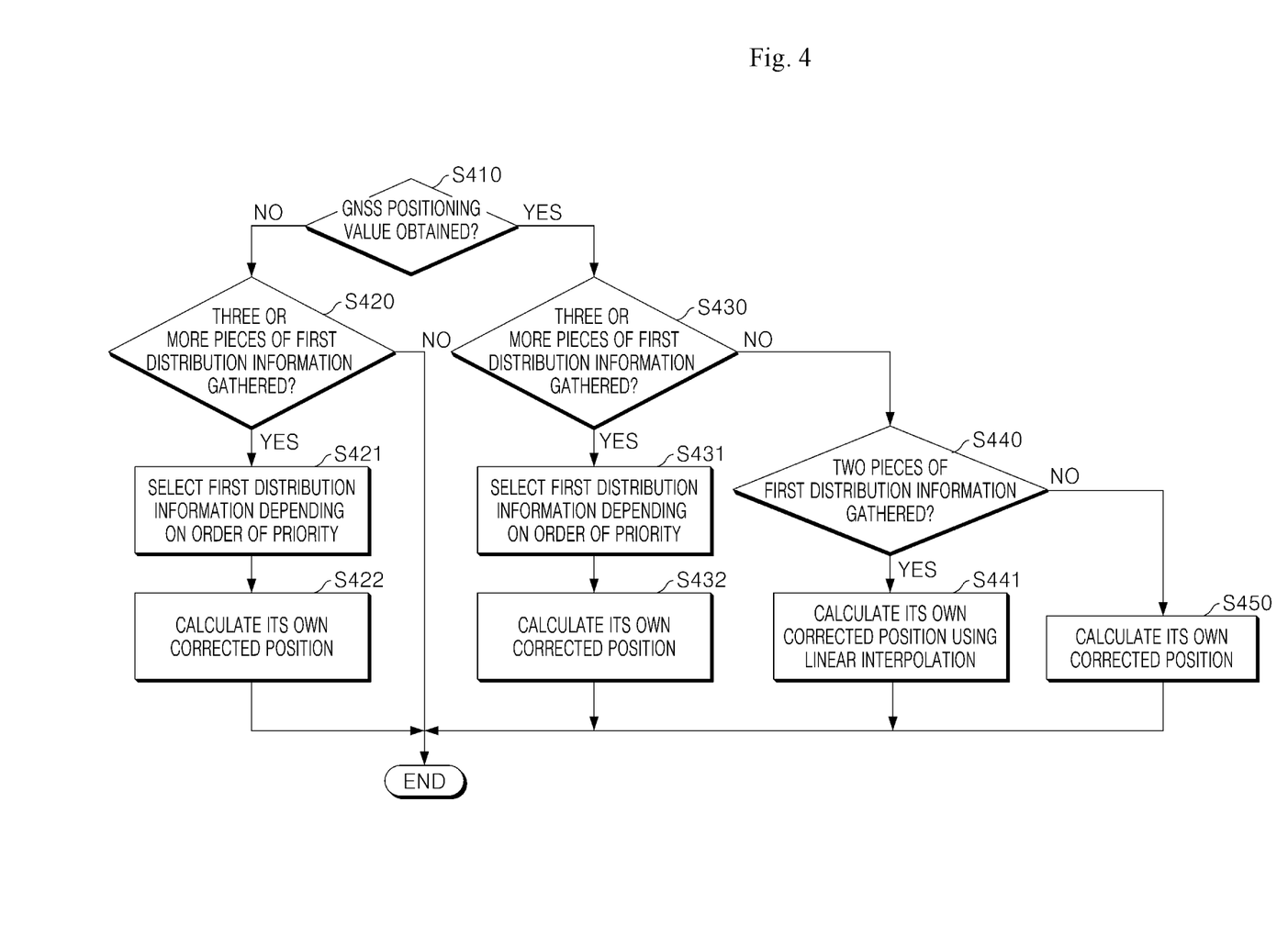
FIG. 4 is a flowchart illustrating step S300 in greater detail depending on various contexts.

FIG. 4 is a flowchart illustrating step S300 in greater detail depending on various contexts.

Referring to FIG. 4, the GNSS receiver 130 may fail to obtain the GNSS positioning value of the precise position correcting apparatus 100 in step S200 (S410). The GNSS receiver 130 may not receive GNSS signals and thus fail to achieve GNSS positioning for various reasons, e.g., the precise position correcting apparatus 100 being positioned in a dead zone, such as inside a building, under a bridge, or inside a tunnel.

In such a case, the precise position correcting apparatus 100 identifies the gathered first distribution information and identifies whether three or more pieces of first distribution information have been gathered (S420). If GNSS positioning fails and less than three pieces of first distribution information are gathered, the precise position correcting apparatus 100 fails to calculate its corrected location and terminates the process. The precise position correcting apparatus 100 may gather first distribution information transmitted from at least one or more mobile or stationary body in three or more different points.

If there or more pieces of first distribution information are gathered, the precise position correcting apparatus 100 may select three pieces of first distribution information optimal to the precise position correcting apparatus 100 depending on order of priority (S421).

The precise position correcting apparatus 100 selects the three optimal pieces of first distribution information from multiple pieces of first distribution information using at least one or more of pieces of information about the number of satellite receptions used for GNSS positioning of the external terminal, the difference between the transmission power and reception power of the first distribution information, GNSS positioning time included in the first distribution information, the time of reception of the first distribution information, and the positioning quality of the first distribution information. A weight may be properly determined for each of the pieces of information, and selecting the optimal piece of first distribution information depending on the pieces of information and their respective weights has been described above.

Then, the precise position correcting apparatus 100 calculates its corrected location from the three pieces of first distribution information (S422).

The precise position correcting apparatus 100 calculates the distance to the external terminal having sent the first distribution information and calculates its corrected location by applying trigonometry surveying to the precise positioning value of the external terminal having sent the first distribution information and the distance to the external terminal having sent the first distribution information. This is described below in greater detail.

Although three optimal pieces of first distribution information are selected from the gathered pieces of first distribution information depending on order of priority in step S421, and the corrected location of the precise position correcting apparatus 100 is calculated using the selected three pieces of first distribution information in step S422, embodiments of the disclosure are not limited thereto. For example, the corrected location of the precise position correcting apparatus 100 may be calculated using all or a specific number of, or more, the pieces of first distribution information gathered.

Figure 5:
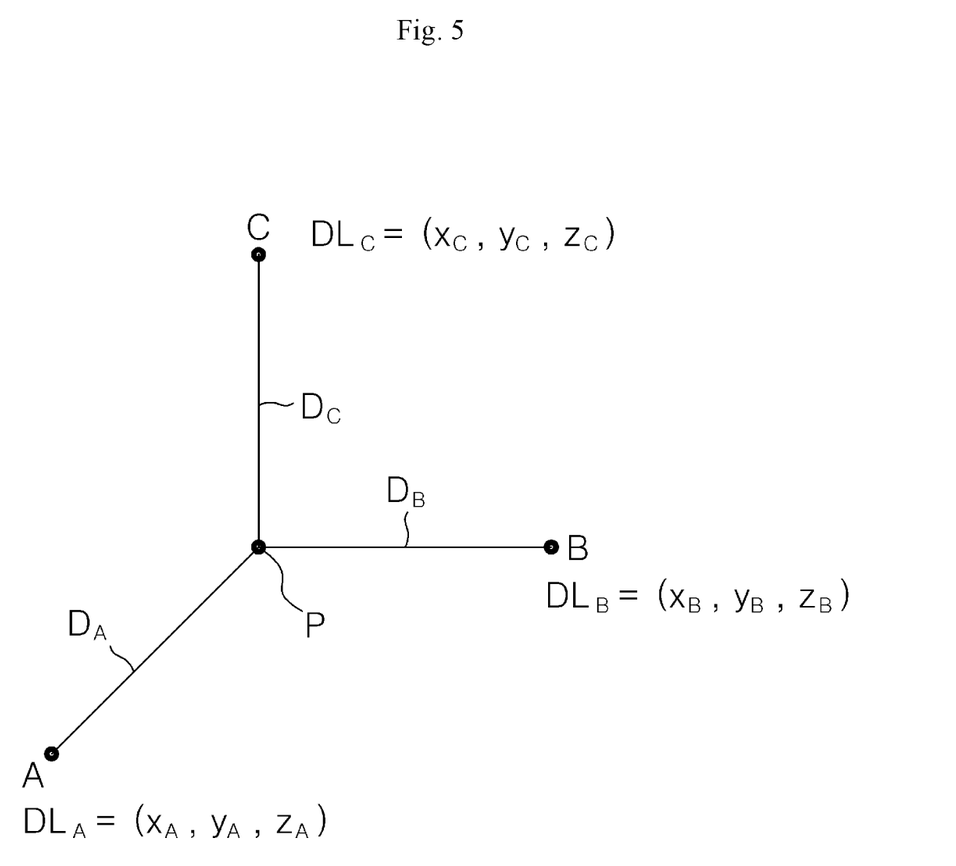
FIG. 5 is a view illustrating a process of calculating a corrected location of a precise position correcting apparatus when GNSS positioning fails and three or more pieces of first distribution information are gathered according to an embodiment.

FIG. 5 is a view illustrating a process of calculating a corrected location of a precise position correcting apparatus when GNSS positioning fails and three or more pieces of first distribution information are gathered according to an embodiment.

The process of calculating the corrected location of the precise position correcting apparatus 100 as shown in FIG. 5 is described in connection with step S422 of FIG. 4.

Referring to FIG. 5, the corrected location of the precise position correcting apparatus 100 is P, the positions of external terminals transmitting three pieces of first distribution information are A, B, and C, and the precise positioning values included in the pieces of first distribution information transmitted from the external terminals are $DL_A$, $DL_B$, and $DL_C$.

As described above, the first distribution information includes the GNSS positioning time, GNSS positioning value, precise positioning value, and difference between the GNSS positioning value and the precise positioning value, and the first distribution information may further include information for at least one of the number of satellite receptions used for GNSS positioning, transmission power of the first distribution information, and positioning quality of the first distribution information.

Since the first distribution information contains transmission power, the received signal strength indicator (RSSI) of each piece of first distribution information may be obtained using the reception power when the first distribution information is received.

Equation 1 below is Friis formula, and Equation 2 may be derived from Equation 1.

$$L = 20\ \log_{10}\left(\frac{4\pi d}{\lambda}\right) \qquad \text{[Equation 1]}$$

where λ is the wavelength, d is the distance to the external terminal having transmitted the first distribution information, and L is the RSSI of the first distribution information.

$$d = \frac{\lambda}{4\pi} \cdot 10^{\frac{L}{20}} \qquad \text{[Equation 2]}$$

Since λ=c/f (f is the frequency and c is the speed of light), the distance d may be expressed as in Equation 3 below.

$$d = \frac{c}{4\pi f} \cdot 10^{\frac{L}{20}} \qquad \text{[Equation 3]}$$

$D_A$, $D_B$, and $D_C$, respectively indicating the distance between P and $DL_A$, the distance between P and $DL_B$, and the distance between P and $DL_C$, may be obtained by Equation 3 above.

If the corrected location of P is (x, y, z), the relationships between P and $D_A$, $D_B$, and $D_C$ follow the Pythagorean theorem as in Equation 4 below.

$$D_A^2 = (x-x_A)^2 + (y-y_A)^2 + (z-z_A)^2$$

$$D_B^2 = (x-x_B)^2 + (y-y_B)^2 + (z-z_B)^2$$

$$D_C^2 = (x-x_C)^2 + (y-y_C)^2 + (z-z_C)^2$$

Since $D_A$, $D_B$, and $D_C$ and $X_A$, $X_B$, and $X_C$ are known, x, y, and z may be obtained by solving Equation 4, so that the corrected location, P, may be obtained.

Turning back to FIG. 4, when the GNSS positioning value is obtained, the precise position correcting apparatus 100 identifies the gathered first distribution information and identifies whether three or more pieces of first distribution information have been gathered (S430). The precise position correcting apparatus 100 may gather first distribution information transmitted from at least one or more mobile or stationary body in three or more different points.

If there or more pieces of first distribution information are gathered, the precise position correcting apparatus 100 may select three pieces of first distribution information optimal to the precise position correcting apparatus 100 depending on order of priority (S431). The precise position correcting apparatus 100 selects the three optimal pieces of first distribution information from the multiple pieces of first distribution information gathered using at least one or more of pieces of information about the number of satellite receptions used for GNSS positioning of the external terminal, the difference between the transmission power and reception power of the first distribution information, GNSS positioning time included in the first distribution information, the time of reception of the first distribution information, and the positioning quality of the first distribution information. A weight may be properly determined for each of the pieces of information, and selecting the optimal piece of first distribution information depending on the pieces of information and their respective weights has been described above.

Then, the precise position correcting apparatus 100 calculates its corrected location using its GNSS positioning value and three pieces of first distribution information (S432).

Although three optimal pieces of first distribution information are selected from the gathered pieces of first distribution information depending on order of priority in step S431, and the corrected location of the precise position correcting apparatus 100 is calculated using the selected three pieces of first distribution information in step S432, embodiments of the disclosure are not limited thereto. For example, the corrected location of the precise position correcting apparatus 100 may be calculated using all or a specific number of, or more, the pieces of first distribution information gathered.

Figure 6:
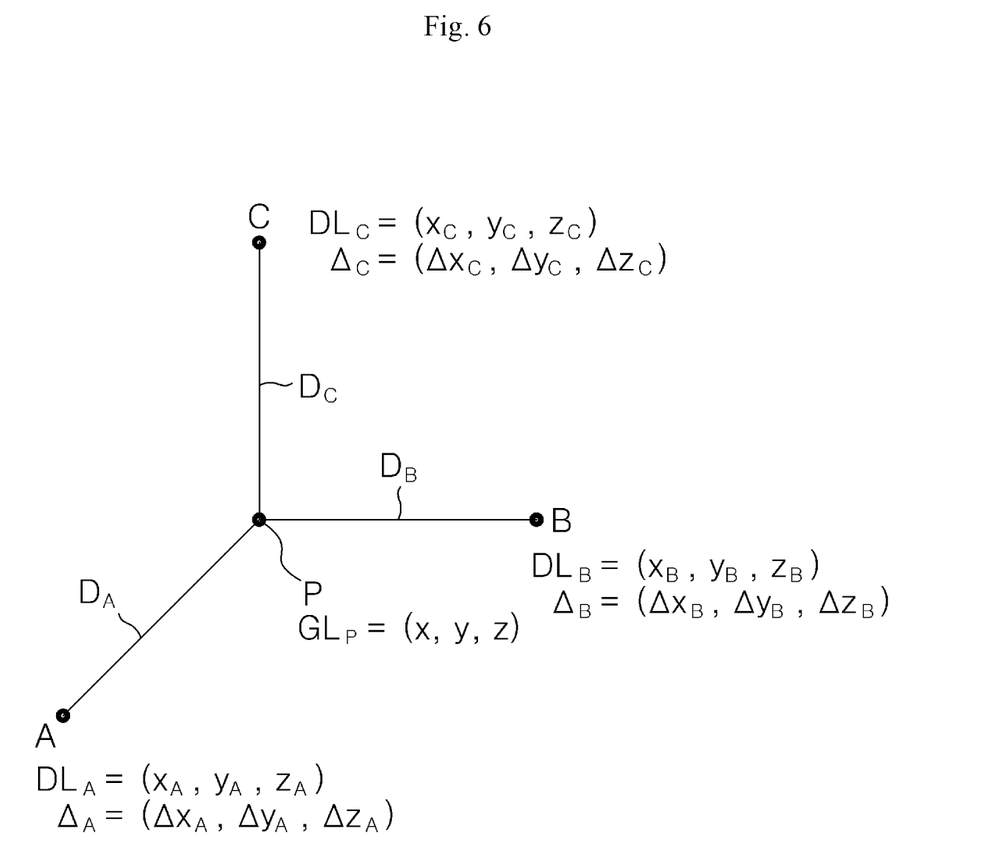
FIG. 6 is a view illustrating a process of calculating a corrected location of a precise position correcting apparatus when GNSS positioning succeeds and three or more pieces of first distribution information are gathered according to an embodiment.

FIG. 6 is a view illustrating a process of calculating a corrected location of a precise position correcting apparatus when GNSS positioning succeeds and three or more pieces of first distribution information are gathered according to an embodiment.

The process of calculating the corrected location of the precise position correcting apparatus 100 as shown in FIG. 6 is described in connection with step S432 of FIG. 4.

Referring to FIG. 6, the corrected location of the precise position correcting apparatus 100 IS P, the GNSS positioning value of the precise position correcting apparatus 100 is $GL_P$, the positions of external terminals having transmitted three pieces of first distribution information are A, B, and C, the precise positioning values included in the pieces of first distribution information transmitted from the external terminals in the positions are $DL_A$, $DL_B$, and $DL_C$, and the positioning differences included in the pieces of first distribution information transmitted from the external terminals in the positions are $\Delta A$, $\Delta B$, and $\Delta C$.

If $GL_P$, which is the GNSS positioning value of the precise position correcting apparatus 100, is (x, y, z), $D_A$, which is the distance between $GL_P$ and $DL_A$, $D_B$, which is the distance between $GL_P$ and $DL_B$, and $D_C$, which is the distance between $GL_P$ and $DL_C$, are expressed as in Equation 5 below:

$$D_A = \sqrt{(x-x_A)^2+(y-y_A)^2+(z-z_A)^2}$$
$$D_B = \sqrt{(x-x_B)^2+(y-y_B)^2+(z-z_B)^2}$$
$$D_C = \sqrt{(x-x_C)^2+(y-y_C)^2+(z-z_C)^2}$$ 
[Equation 5]

In this case, the weight for the positioning error is expressed as in Equation 6, and the resultant most probable value may be expressed as in Equation 7 below.

$$A:B:C = \frac{1}{D_A}:\frac{1}{D_B}:\frac{1}{D_C} = D_B \cdot D_C : D_A \cdot D_C : D_A \cdot D_B \quad \text{[Equation 6]}$$

$$x^{1'} = \frac{D_B \cdot D_C \cdot \Delta x_A + D_C \cdot D_A \cdot \Delta x_B + D_A \cdot D_B \cdot \Delta x_C}{D_A \cdot D_B + D_B \cdot D_C + D_C \cdot D_A} + x \quad \text{[Equation 7]}$$

$$y^{1'} = \frac{D_B \cdot D_C \cdot \Delta y_A + D_C \cdot D_A \cdot \Delta y_B + D_A \cdot D_B \cdot \Delta y_C}{D_A \cdot D_B + D_B \cdot D_C + D_C \cdot D_A} + y$$

$$z^{1'} = \frac{D_B \cdot D_C \cdot \Delta z_A + D_C \cdot D_A \cdot \Delta z_B + D_A \cdot D_B \cdot \Delta z_C}{D_A \cdot D_B + D_B \cdot D_C + D_C \cdot D_A} + z$$

Thus, first most probable values $x^{1'}$, $y^{1'}$, $z^{1'}$ may be obtained by Equation 7.

Second most probable values $x^{2'}$, $y^{2'}$, $z^{2'}$ may be obtained by replacing x, y, and z with $x^{1'}$, $y^{1'}$, $z^{1'}$, respectively, and replacing $x^{1'}$, $y^{1'}$, $z^{1'}$ with $x^{2'}$, $y^{2'}$, $z^{2'}$, respectively, in Equations 5 and 7 followed by repeating the above-described process. This process may be repeated n times, producing nth most probable values $x^{n'}$, $y^{n'}$, $z^{n'}$. If n is large enough, the nth most probable values which are within a permitted error range may be obtained, and the precise position correcting apparatus 100 may determine that the nth most probable values are the corrected location P.

Referring back to FIG. 4,

If the number of pieces of first distribution information gathered is less than three in step S430 and is two (S440), the precise position correcting apparatus 100 calculates its corrected location using linear interpolation (S441).

In step S441, since there are two pieces of first image data gathered, and there is the GNSS positioning value of the precise position correcting apparatus 100, the precise position correcting apparatus 100 obtains the distance to the external terminal having transmitted the first distribution information from the GNSS positioning value of the precise position correcting apparatus 100 using Equation 3 above.

If the distance to the external terminal having transmitted the first distribution information from the GNSS positioning value of the precise position correcting apparatus 100, the precise position correcting apparatus 100 interpolates the positioning difference included in each piece of first distribution information with the distance to each external terminal having transmitted the first distribution information, thus calculating its final corrected location.

If there is one piece of first distribution information gathered in step S440, the precise position correcting apparatus 100 calculates its corrected location by applying the positioning difference included in the first distribution information to its GNSS positioning value (S450).

As described above, embodiments of the disclosure may obtain the corrected location of the precise position correcting apparatus 100 based on, e.g., GNSS positioning values calculated by moving mobile means or stationary base stations and positioning differences broadcast from the moving mobile means or stationary base stations, thereby enhancing the accuracy of the current GNSS-based location obtained via the GNSS receiver.

The above-described embodiments are merely examples, and it will be appreciated by one of ordinary skill in the art various changes may be made thereto without departing from the scope of the disclosure. Accordingly, the embodiments set forth herein are provided for illustrative purposes, but not to limit the scope of the disclosure, and should be appreciated that the scope of the disclosure is not limited by the embodiments. The scope of the disclosure should be construed by the following claims, and all technical spirits within equivalents thereof should be interpreted to belong to the scope of the disclosure.

What is claimed is:

1. An apparatus for precise position correction using a positioning difference, the apparatus comprising:
    a first distribution information obtaining unit gathering at least one first distribution information item from at least one external terminal;
    a global navigation satellite system (GNSS) receiver obtaining a GNSS positioning value of the apparatus based on a GNSS; and
    a positioning correcting unit obtain a corrected location of the apparatus by correcting the GNSS positioning value using the at least one first distribution information item gathered, wherein the at least one first distribution information item includes a GNSS positioning value of the at least one external terminal, a GNSS positioning time of the at least one external terminal, a precise positioning value of the at least one external terminal, and a positioning difference, of the at least one external terminal, between the GNSS positioning value of the at least one external terminal and the precise positioning value, wherein the at least one first distribution information item further includes information about at least one of the number of satellites used for GNSS positioning of the at least one external terminal, transmission power of the at least one first distribution information item, and positioning quality of the at least one first distribution information item, wherein the apparatus further comprises a priority determining unit selecting one first distribution information item with a highest priority from among the at least one first distribution information item gathered using at least one of the number of the satellites used for GNSS positioning of the at least one external terminal, a difference between the transmission power and reception power of the at least one first distribution information item, the GNSS positioning time included in the at least one first distribution information item, a time of reception of the at least one first distribution information item, and the positioning quality of the at least one first distribution information item, and wherein the positioning correcting unit calculates the corrected location of the apparatus using the selected first distribution information item.

2. The apparatus of claim 1, further comprising a second distribution information generating unit generating second distribution information broadcast to an outside of the apparatus, wherein the second distribution information includes the GNSS positioning value of the apparatus and a positioning time of the apparatus, the corrected location of the apparatus, and a positioning difference between the corrected location of the apparatus and the GNSS positioning value of the apparatus.

3. The apparatus of claim 1, further comprising a second distribution information generating unit generating second distribution information including the GNSS positioning value of the apparatus and the positioning time, the corrected location of the apparatus, and the positioning difference between the corrected location of the apparatus and the GNSS positioning value of the apparatus, wherein the second distribution information further includes at least one of the number of satellites used for GNSS positioning of the apparatus, transmission power of the second distribution information, and positioning quality of the second distribution information, and wherein the second distribution information is broadcast to an outside of the apparatus to be used for the at least one external terminal to correct the GNSS positioning value of the at least one external terminal.

4. The apparatus of claim 1, wherein when the GNSS receiver fails to obtain a GNSS signal, the priority determining unit selects at least three first distribution information items with a higher priority from among the gathered, at least one, first distribution information item, and the positioning correcting unit calculates distances to the at least one external terminal transmitting the at least three first distribution information items selected and obtains the corrected location of the apparatus using the calculated distances to the at least one external terminal.

5. An apparatus for precise position correction using a positioning difference, the apparatus comprising:
    a first distribution information obtaining unit gathering at least one first distribution information item from at least one external terminal;
    a global navigation satellite system (GNSS) receiver obtaining a GNSS positioning value of the apparatus based on a GNSS; and
    a positioning correcting unit obtain a corrected location of the apparatus by correcting the GNSS positioning value using the at least one first distribution information item gathered, wherein the at least one first distribution information item includes a GNSS positioning value of the at least one external terminal, a GNSS positioning time of the at least one external terminal, a precise positioning value of the at least one external terminal, and a positioning difference, of the at least one external terminal, between the GNSS positioning value of the at least one external terminal and the precise positioning value, wherein when a number of the at least one first distribution information item received is two, the positioning correcting unit calculates distances to the at least one external terminal transmitting the two first distribution information items and calculates the corrected location of the apparatus using linear interpolation depending on the calculated distances.

6. A method for precise position correction using a positioning difference, the method performed by an apparatus for precise position correction using the positioning difference, the method comprising:
    gathering at least one first distribution information item from an at least one external terminal, the at least one first distribution information item including a GNSS positioning value of the at least one external terminal, a positioning time, a precise positioning value, and a positioning difference between the GNSS positioning value and the precise positioning value;
    obtaining a GNSS positioning value of the apparatus based on a GNSS; and obtaining a corrected location of the apparatus by correcting the GNSS positioning value of the apparatus using the gathered, at least one, first distribution information item, wherein the at least one first distribution information item further includes information about at least one of the number of satellites used for GNSS positioning of the at least one external terminal, transmission power of the at least one first distribution information item, and positioning quality of the at least one first distribution information item, wherein the method further comprises, before obtaining the corrected location, selecting one first distribution information item with a highest priority from among the at least one first distribution information item gathered using at least one of the number of the satellites used for GNSS positioning of the at least one external terminal, a difference between the transmission power and reception power of the at least one first distribution information item, the GNSS positioning time included in the at least one first distribution information item, a time of reception of the at least one first distribution information item, and the positioning quality of the at least one first distribution information item, and wherein obtaining the corrected location includes obtaining the corrected location of the apparatus using the selected first distribution information item.

7. The method of claim 6, further comprising generating second distribution information broadcast to an outside of the apparatus, wherein the second distribution information includes the GNSS positioning value of the apparatus and a positioning time of the apparatus, the corrected location of the apparatus, and a positioning difference between the corrected location of the apparatus and the GNSS positioning value of the apparatus.

8. The method of claim 6, further comprising generating second distribution information including the GNSS positioning value of the apparatus and the positioning time, the corrected location of the apparatus, and the positioning difference between the corrected location of the apparatus and the GNSS positioning value of the apparatus, wherein the second distribution information further includes at least one of the number of satellites used for GNSS positioning of the apparatus, transmission power of the second distribution information, and positioning quality of the second distribution information, and wherein the second distribution information is broadcast to an outside of the apparatus to be used for the at least one external terminal to correct the GNSS positioning value of the at least one external terminal.

9. The method of claim 6, wherein when a number of the at least one first distribution information item received is two, obtaining the corrected location includes calculating distances to the at least one external terminal transmitting the two first distribution information items and obtaining the corrected location of the apparatus using linear interpolation depending on the calculated distances.

10. The method of claim 6, wherein when a GNSS receiver of the apparatus fails to obtain a GNSS signal, selecting the one first distribution information item with the higher priority includes selecting at least three first distribution information items with a higher priority from among the gathered, at least, one first distribution information, and obtaining the corrected location includes calculating distances to the at least one external terminal transmitting the at least three first distribution information items selected and obtaining the corrected location of the apparatus using the calculated distances to the at least one external terminal.

* * * * *